United States Patent [19]
Aronberg

[11] 3,865,641
[45] Feb. 11, 1975

[54] COMPOSITIONS FOR USE IN SOLDERING STAINLESS STEELS

[75] Inventor: Lester Aronberg, Chicago, Ill.

[73] Assignee: Lake Chemical Company, Chicago, Ill.

[22] Filed: Jan. 14, 1972

[21] Appl. No.: 217,832

[52] U.S. Cl. ................................. 148/23, 148/24
[51] Int. Cl. ............................................ B23k 35/24
[58] Field of Search ............................... 148/22–26

[56] References Cited
UNITED STATES PATENTS

| | | | |
|---|---|---|---|
| 1,882,567 | 10/1932 | Saukaitis | 148/25 |
| 1,882,734 | 10/1932 | Barber | 148/23 |
| 2,480,723 | 8/1949 | Evans | 148/24 |
| 2,508,501 | 5/1950 | Guiulio | 148/24 |
| 2,547,771 | 4/1951 | Pessel | 148/24 |
| 2,581,820 | 1/1952 | Stright | 148/23 |
| 2,772,192 | 11/1956 | Wobbe | 148/23 |
| 3,597,285 | 8/1971 | Aronberg | 148/26 |
| 3,660,127 | 5/1972 | Aronberg | 148/26 |

Primary Examiner—L. Dewayne Rutledge
Assistant Examiner—Peter D. Rosenberg
Attorney, Agent, or Firm—Wallenstein, Spangenberg, Hattis & Strampel

[57] ABSTRACT

Soldering compositions for use in soldering stainless steels comprising an intimate mixture of a particulate or powdered solder for use in soldering stainless steels and an amine-type inhibiting agent and, desirably, a wetting agent. The compositions are adapted to be mixed with a soldering flux such as a phosphoric acid for use in soldering stainless steels.

15 Claims, No Drawings

COMPOSITIONS FOR USE IN SOLDERING STAINLESS STEELS

This invention relates to compositions for use in the soldering of stainless steels and to the soldering of stainless steels with said compositions.

Perhaps the most satisfactory of the fluxes used in the soldering of stainless steels is orthophosphoric acid. Heretofore, however, the use of orthophosphoric acid, as well as other acid-type fluxes for use in soldering stainless steels, required that the solder employed separately with the flux be in the form of wire, rods or bars. In connection with my work which led to the making of my present invention, I have endeavored to admix with the acid flux particulate or powdered solders for soldering stainless steels. This was, however, unsatisfactory because the acid was too reactive with the powdered solder, resulting in the decomposition of the acid flux and the loss of solder. The advantages of acid fluxes, especially phosphorus-containing acid fluxes such as orthophosphoric acid, could not, therefore, be realized in the many instances where it was desired to use powdered solder for soldering stainless steels.

In my further initial work, from which the present invention evolved, an attempt was made to inhibit, or delay, the reaction between the acid flux and the powdered solder by adding an inhibiting agent to the acid flux prior to mixing it with a powdered solder for use in soldering stainless steels. However, this practice was found to prolong the useful life of the powdered solder-flux mixture for a period of only about 6 hours, a time period which fell far short of even the minimum 24 hour useful life period deemed by the trade to be acceptable.

Surprisingly, it has been found, in accordance with the present invention, that when a small amount of an inhibiting agent, effective to inhibit the action of acids, especially a nitrogen-containing inhibiting agent of the amine-type, is mixed with the powdered solder instead of the acid flux, as described above, and the inhibiting agent-containing powdered solder is then mixed with the acid flux, powdered solder-acid flux mixtures are obtained which have a useful life commonly of the order of at least 48 hours, and frequently upwardly of 4 days. The inhibiting agent may be thoroughly mixed with the powdered solder in an essentially dry state, that is, without a diluent, to form a generally granular mass. Advantageously, however, the inhibiting agent and the powdered solder are initially formed into a smooth, substantially homogeneous paste by utilizing a diluent, particularly a liquid which, desirably, is a solvent for the inhibiting agent. A small amount of a wetting agent desirably is incorporated into the mixture to promote uniform distribution of the inhibiting agent in the powdered solder. While the powdered solder-inhibiting agent mixture can be utilized in the form of a smooth paste, in accordance with the preferred practice of the invention, the solvent employed in forming the paste is evaporated off until the mixture is converted to a granular consistency.

The particulate or powdered solders useful in the preparation of the compositions of the present invention can be selected from any of various solders employed to form seams or joints between stainless steels and metals, which latter may be stainless steels of the same or different character, or which may be copper, copper-base alloys and copper-containing alloys, or non-stainless steels. Exemplary of such solders are 50 percent tin - 50 percent lead; 60 percent tin - 40 percent lead; 40 percent tin - 60 percent lead; 30 percent tin - 70 percent lead; 95 percent tin - 5 percent antimony; 100 percent tin; 100 percent lead; 97 percent lead - 3 percent antimony; 97 percent tin - 3 percent silver, and variants of much solders and other known soft solders. It is preferred to use approximately 50 percent tin - 50 percent lead solders since they have good flow properties at relatively low temperatures.

The mesh size of the particles comprising the particulate or powdered solder used in the compositions is variable. Generally speaking, however, it is preferred to use solders comprised of particles having a mesh size of the order of about 90 to about 150, especially desirable about 100 to about 120.

As indicated, the inhibiting agents useful in the preparation of the compositions advantageously are nitrogen-containing agents especially of the amine-type. Typical of amine-type inhibiting agents which can be used are the oxyethylated amines sold under the trademark "POLYRAD" (Hercules, Inc.). These amines are 5- and 11-mole ethylene oxide adducts of dehydroabietylamine. A particularly preferred member of this group of amines is the product sold under the designation "POLYRAD 0515." This product contains an added 15 percent of the unsubstituted amine. All of these oxyethylated amines are sold on a 100 percent basis or as a 70 percent solids solution in isopropanol, and all of them are soluble, or partially soluble, in water. Other amine-type inhibitors which can be used are those disclosed in U.S. Pat. No. 3,113,113, and sold under the trademark "ARMOHIB" (Armour Industrial Chemical Co.). These products are polyalkoxylated mono- and diamines having a $C_8$–$C_{22}$ aliphatic hydrocarbon radical substituted on the nitrogen, and are comprised of from 2 to 50 ethylene oxide groups. Especially useful members of this group of inhibitors are those sold under the designations "ARMOHIB 25" (50 percent concentration of the amine), "ARMOHIB 28" (75 percent concentration of the amine), and "ARMOHIB 31" (100 percent). Still other amines which can be used are the fatty acid amide condensates sold under the trademark "NOPCOCHEX RA" (Nopco Chemical Co.), and the alkyl amino-alkyl phosphates available under the trademarks "UNICOR LHS" and "UNICOR PFC" (Universal Oil). Also useful are urea, substituted ureas such as butylurea, dibutylurea, butyltoluylurea, diphenylurea, and the like.

The wetting agents useful in the formulation of the compositions can be selected from a wide group. Generally speaking, it is preferred to use a wetting agent which is water soluble. Exemplary of agents which can be used are the anionic wetting agents sold under the trademark "GAFAC" (GAF Corporation). These products are mixtures of mono- and diesters of orthophosphoric acid made from nonionic surfactants of the ethylene oxide-adduct type. The product sold under the designation "GAFAC RE–410" is the preferred one of this group. Other wetting agents which can be used are organic phosphate esters, such as sodium lauryl phosphate, sold under the trademark "EMCOL" (Witco Chemical Corporation); alkylphenoxy ethoxylates, exemplified by octylphenoxypoly (ethyleneoxy) ethanol and nonylphenoxypoly (ethyleneoxy) ethanol, sold under the trademark "IGEPAL" (GAF Corporation), in particular "IGEPAL CO–730" and "IGEPAL CA–620"; and the like.

As stated, only a small amount of the inhibiting agent is employed in the compositions of the present invention. More specifically in this connection, the generally optimum objectives of the invention are achieved with compositions utilizing from about 2 to about 5 percent, especially desirably about 3 to 4 percent, of inhibiting agent, by weight of the compositions. The wetting agent, similarly, comprises only a small proportion of the weight of the compositions. Effective results can, for example, be attained with proportions of the wetting agent ranging from about 1 to about 4 percent, more usually about 2 to 3 percent, by weight, of the compositions.

In forming the compositions into their preferred granular consistency the inhibiting agent, as indicated, can be mixed with the powdered solder without employing a diluent. More specifically in this connection, it has been found that when the inhibiting agent, the powdered solder and the wetting agent are mixed, for example, with the aid of a pestle and mortar, the heat generated by frictional forces during the mixing is sufficient to liquify the inhibiting agent and/or the wetting agent thereby to effect substantially uniform distribution of the inhibiting agent in the powdered solder. In accordance with a preferred practice of the invention, however, the desired granular consistency of the compositions is attained by first dissolving the inhibiting agent in a diluent such as water, or an organic solvent, particularly a lower alkyl alcohol such as ethyl or isopropyl alcohol. The powdered solder, and the solubilized inhibiting agent, together with the wetting agent, are then mixed until a mixture having a smooth, substantially homogeneous, paste-like, or syrupy, consistency is obtained. The paste-like mixture is then heated to evaporate off sufficient water, or organic solvent, if such is the case, to impart a granular consistency to the mixture. The mixture, while having a granular consistency, is self-sustaining and workable with the fingers. As indicated, it is in this granular form that the compositions are preferably mixed with the acid flux.

Of the various phosphorous-containing acid fluxes which can be utilized with the compositions of this invention, orthophosphoric acid, and especially desirably, orthorphoric acid flux compositions as disclosed in my U.S. Pat. No. 3,597,285, are most advantageously employed. The orthophosphoric acid compositions of my aforementioned patent comprise, as essential ingredients, a major proportion of a phosphorous-containing acid, especially orthophosphoric acid, and a minor proportion of finely divided metallic copper, or a copper salt such as copper phosphate. The orthophosphoric acid, whether used alone, or as disclosed in my said patent, with the compositions of the present invention may be in the form of aqueous orthophosphoric acid containing as low as 40 percent orthophosphoric acid, or it may be as high as about so-called commercial 115 percent phosphoric acid, but is preferred to utilize about 75 to 105 percent orthophosphoric acid.

The proportions of inhibiting agent-containing powdered solder and phosphorous-containing acid flux employed in forming a soldering composition for use in the soldering of stainless steels in accordance with the practice of the present invention are variable. Generally speaking, all that is required is that the inhibiting agent-containing powdered solder-to-phosphorous-containing acid flux ration be such that the resulting soldering composition has a good working consistency. The generally optimum objectives of the invention, however, are attained with inhibiting agent-containing powdered solder-to-phosphorous-containing acid flux ratios of the order of about 1:1 to about 4:1, or somewhat higher ratios, for instance, 5 or 6:1, with a powdered solder-to-acid flux ratio of about 2:1 generally being especially preferred.

The stainless steels which can be soldered with the compositions of the present invention can be chosen from among the many which are well known to the art. Illustrative of such stainless steels are those containing chromium, for instance, of the order of 18 percent chromium; those containing chromium and titanium, for instance, those containing of the order of 12 percent chromium and 2 percent titanium; those containing varying proportions of chromium and nickel; and those containing varying proportions of chromium, titanium, nickel and vanadium. Illustrative of such stainless steels are those sold commerically under the trade designations 300 series and 400 series.

Conventional soldering techniques and conventional soldering temperatures, generally of the order of about 350° to 625°F, are used with the compositions of the present invention so that no detailed discussion is necessary. Where gutters are made, for instance, the heat utilized in the soldering operation may be supplied by a hot iron or a torch or the like.

The following examples are illustrative of the preparation of compositions made in accordance with the invention. It will be understood that numerous other compositions can be made in the light of the guiding principles and teachings disclosed above. All parts listed are by weight.

EXAMPLE 1:

| | |
|---|---|
| Solder (100 mesh 50% tin — 50% lead) | 30 |
| Inhibitor (Polyrad 0515) | 1 |
| Wetting agent (GAFAC RE-410) | 0.5 |

Sufficient alcohol (95 percent ethyl alcohol) is added to the inhibitor to dissolve it. The wetting agent is added to the dissolved inhibitor, and the solution is then mixed with the solder to form a smooth, syrupy paste. The mixture is then heated to a temperature of about 80°C to evaporate off the alcohol until the mixture has a granular consistency. The granular mixture is workable and can be formed into a bll with the fingers.

EXAMPLE 2:

| | |
|---|---|
| Solder (100 mesh 60% tin — 40% lead) | 60 |
| Inhibitor (Armohib 28) | 2 |
| wetting agent (IGEPAL CO-730) | 1 |

EXAMPLE 3:

| | |
|---|---|
| Solder (100 mesh 50% tin — 50% lead) | 30 |
| Inhibitor (butyltoluylurea) | 1.5 |

EXAMPLE 4:

| Solder (120 mesh 97% lead — 3% antimony) | 32 |
|---|---|
| Inhibitor (Armohib 31) | 1 |
| Wetting agent (GAFAC RE-410) | 1 |

EXAMPLE 5:

| Solder (100 mesh 100% tin) | 30 |
|---|---|
| Inhibitor (Polyrad 0515) | 1 |
| Wetting agent (GAFAC RE-410) | 1 |

EXAMPLE 6:

| Solder (100 mesh 30% tin — 70% lead) | 64 |
|---|---|
| Inhibitor (Polyrad 1110) | 3 |
| Wetting agent (IGEPAL CO-730) | 1 |

EXAMPLE 7:

| Solder (100 mesh 50% tin — 50% lead) | 31 |
|---|---|
| Inhibitor (Urea) | 5 |
| Wetting agent (GAFAC RE-610) | 1.5 |

The compositions of Examples 2 through 7 are worked up as in Example 1.

EXAMPLE 8:

| Solder (100 mesh 95% tin — 5% antimony) | 40 |
|---|---|
| Inhibitor (Armohib 25) | 1.5 |
| Wetting agent (GAFAC RE-410) | 1 |

The powdered solder, the inhibiting agent and the wetting agent are placed in a mortar and worked with a pestle until a substantially homogeneous mixture, having a granular consistency, is obtained.

EXAMPLE 9:

| Solder (100 mesh 95% tin — 5% antimony) | 30 |
|---|---|
| Inhibitor (Polyrad 0515) | 1 |
| Wetting agent (GAFAC RE-410) | 0.5 |

The composition is worked up as in Example 1, and 2 parts of the resulting granular mixture are added to 1 part of an acid flux composition comprising 100 parts by weight of orthophosphoric acid (75 percent) and 2 parts by weight of basic copper carbonate.

EXAMPLE 10

Two parts of the composition of Example 1 are mixed with 1 part of orthophosphoric acid (75 percent). The mixture is allowed to remain in the mixing vessel for 48 hours. There is no visible evidence of a reaction between the composition and the acid. The mixture is used to solder two pieces of 18 percent chromium stainless steel. An excellent joint is formed.

EXAMPLE 11

Two parts of the composition of Example 1 are mixed with 1 part of an acid flux composition as described in Example 9. The mixture is stored for 92 hours. There is no visible evidence of a reaction between the compositions and the acid. Two pieces of stainless are soldered with the mixture as in Example 10. An excellent joint is formed.

EXAMPLE 12

A mixture if formed and tested as in Example 10, except that the acid flux comprises, by weight, 100 parts phosphorus acid (70–72 percent), 10 parts basic cupric carbonate and 12 parts "Pluronic 84." The results are as reported in Example 10.

EXAMPLE 13

To demonstrate the utility of the compositions in the making of sweat-joints, a layer of the composition-acid flux mixture of Example 9 is applied to the inner wall at one end of a section of 5/16 inch ID stainless steel tubing and to the outer wall at one end of a section of 1/4 inch OD copper tubing. The coated end of the copper tubing is inserted about 1/2 inch into the coated end of the stainless steel tube and the nested ends are heated to 400°F to fuse the two sections of tubing. The joint is tested for leaks and is found to be free thereof. The joint can be reinforced by applying solder, in the form of wire or rods, for use in soldering stainless steels, around the joint in accordance with standard practices.

What is claimed is:

1. A soldering compsotion for use in soldering stainless steels consisting essentially of an intimate mixture of from about 95 to about 98 percent, by weight, of a solder in particulate form for use in soldering stainless steels and from about 5 to about 2 percent, by weight, of an inhibiting agent effective to inhibit the action of a phosphorous-containing acid used in soldering stainless steels.

2. A composition as claimed in claim 1 which includes a small amount of a wetting agent.

3. A composition as claimed in claim 1 wherein the inhibiting agent is a nitrogen-containing inhibiting agent.

4. A composition as claimed in claim 3 wherein the nitrogen-containing inhibiting agent is selected from the group consisting of 5- and 11-mole ethylene oxide adducts of dehydroabietylamine; polyalkoxylated mono- and diamines having a $C_8$–$C_{22}$ aliphatic hydrocarbon substituted on the nitrogen and containing from 2 to 50 ethylene oxide groups; fatty acid amide condensates; alkyl amino-alkyl phosphates; urea; and alkyl, aryl and alkaryl substituted ureas.

5. A composition as claimed in claim 1 wherein the particles comprising the solder have a mesh size of about 90 to about 150.

6. A composition for use in soldering stainless steels comprising a mixture of (a) an intimate mixture consisting essentially of from about 95 to about 98 percent, by weight, of a solder in particulate form for use in soldering stainless steels and from about 5 to about 2 percent, by weight, of an inhibiting agent effective to inhibit the action of a phosphorous-containing acid used in soldering stainless steels, and (b) an acid flux comprising at least one phosphorous-containing acid.

7. A compositin as claimed in claim 6 wherein the ratio of (a) to (b) is about 1:1 to about 4:1.

8. A composition as claimed in claim 6 wherein the acid flux is orthophosphoric acid.

9. A composition as claimed in claim 6 wherein the acid flux is a composition comprising, as essential ingredients, a major proportion of orthophosphoric acid and a minor proportion of finely divided copper or a copper salt.

10. A method of making a powdered solder-flux composition for use in soldering stainless steels comprising forming a powdered solder-inhibiting composition as claimed in claim 1, and admixing therewith a flux comprising at least one phosphorous-containing acid to said composition.

11. A method according to claim 10 wherein the ratio of the powdered solder-inhibiting composition to the flux is about 1:1 to about 4:1.

12. A method according to claim 10 wherein the flux is orthophosphoric acid.

13. In the soldering of stainless steels, the improvement which comprises utilizing a composition as claimed in claim 1.

14. In the soldering of stainless steels, the improvement which comprises utilizing a composition as claimed in claim 6.

15. In the soldering of stainless steel in which a soldering flux is used, the improvement which comprises utilizing a powdered solder-flux composition made in accordance with the method of claim 10.

* * * * *